United States Patent [19]
Ashley et al.

[11] Patent Number: 6,091,069
[45] Date of Patent: Jul. 18, 2000

[54] INFRARED OPTICAL SYSTEM

[75] Inventors: Timothy Ashley; Charles Thomas Elliott; Neil Thomson Gordon; Ralph Stephen Hall, all of Malvern, United Kingdom

[73] Assignee: The Secretary of State for Defence in Her Britannic Majesty's Government of the United Kingdom of Great Britain and Northern Ireland, Farnborough, United Kingdom

[21] Appl. No.: 09/043,793

[22] PCT Filed: Nov. 11, 1996

[86] PCT No.: PCT/GB96/02777

§ 371 Date: Mar. 27, 1998

§ 102(e) Date: Mar. 27, 1998

[87] PCT Pub. No.: WO97/18448

PCT Pub. Date: May 22, 1997

[30] Foreign Application Priority Data

Nov. 16, 1995 [GB] United Kingdom ................ 9523449

[51] Int. Cl.[7] .................................................. G01J 5/06
[52] U.S. Cl. ................ 250/352; 250/493.1; 250/504 R; 257/147; 257/192
[58] Field of Search .............................. 250/493.1, 352, 250/504 R; 257/197, 192

[56] References Cited

U.S. PATENT DOCUMENTS 5,444,250  8/1995  Dietmar .
5,834,778  11/1998  Veyrier et al. ..................... 250/352

FOREIGN PATENT DOCUMENTS 0 132 345  1/1985  European Pat. Off. .
0 290 751  11/1988  European Pat. Off. .

OTHER PUBLICATIONS

Berdahl et al, "Negative Luminescence of Semiconductors" *Infrared Physics* vol. 29, No. 2–4, 1989, pp. 667–672.

*Primary Examiner*—Constantine Hannaher
*Assistant Examiner*—Andrew Israel
*Attorney, Agent, or Firm*—Nixon & Vanderhye P.C.

[57] ABSTRACT

An infrared optical system incorporates a lens for imaging a remote scene onto a detector within a cold shield. Stray radiation incident on the detector is reduced by an optical stop in the form of a light emitting diode producing negative luminescence. The LED emits less radiation than background, and contributes less to the detector photon noise than an optical stop not exhibiting negative luminescence.

11 Claims, 1 Drawing Sheet

INFRARED OPTICAL SYSTEM

This invention relates to an infrared optical system, and more particularly to noise reduction in such a system incorporating a background limited detector.

An infrared detector is said to be "background limited" when the detector noise is predominantly due to fluctuations in the rate at which photons reach it. Such a detector in an infrared optical system will receive photons both from an imaged scene and from sources of stray radiation which do not contain scene information. If stray radiation can be reduced or eliminated, detector noise is reduced without affecting photons from the scene and the system signal to noise ratio is therefore improved.

To reduce stray radiation in infrared optical systems employing a cooled array of detector elements, it is known to employ a shield which is itself cooled by the detector cooling apparatus. The shield is cooled to reduce its thermal emission reaching the detector array. However, in practice it is difficult to provide an efficient cold shield. The problem occurs because of the finite size of the detector array. In order to avoid vignetting of the elements at the edge of the array, the size of the cold shield aperture must be increased, making it less efficient. The problem is reduced by using a larger cold shield more remote from the detector array, but this gives rise to cooling difficulties. A large cold shield increases cooling apparatus requirements and cool down time, and a small cold shield is inefficient in excluding stray radiation. This problem is particularly severe in infrared optical systems having a high f-number and/or in those incorporating a large detector such as a long linear array or a two-dimensional array of detector elements.

One approach to reducing stray light is to position an uncooled concave mirror around a lens in the infrared optical system responsible for imaging a scene onto the detector. The mirror has a central hole to accommodate the lens. The mirror radius of curvature is equal to the mirror-detector separation so that the detector coincides with its image. The mirror necessarily has low emissivity and so generates relatively few photons. However, the mirror can reflect stray radiation to the detector, there remains residual emission from the mirror which causes difficulty and the mirror gives alignment problems.

It is an object of the invention to provide an alternative form of infrared optical system.

The present invention provides an infrared optical system including detecting means and an optical stop arranged to exclude stray radiation from reaching the detecting means, characterised in that the optical stop is arranged to exhibit negative luminescence to reduce radiation incident on the detecting means.

The invention provides the advantage that the detecting means is shielded from stray radiation by the optical stop without the penalty of receiving as much radiation as that from a stop without negative luminescence characteristics but of equivalent nature otherwise.

The optical stop preferably incorporates a hole which is disposed coaxially with an optical axis of the system.

The system may have a single objective lens for directing infrared radiation to the detecting means and a cold shield for the detecting means, the optical stop being located between the lens and cold shield.

The system may alternatively have a plurality of focusing elements arranged in combination to image a scene onto the detecting means, the optical stop being positioned interjacent the focusing elements and detecting means of the system. The optical stop may be positioned between the detecting means and that focusing element which is nearest to it or at an intermediate focal plane within the plurality of focusing elements. The system may include means for scanning a scene over the detecting means.

The system may incorporate scanning means arranged to scan a scene over the detecting means the optical stop being disposed between the detecting means and an optical element which is nearest to the detecting means.

The optical stop may at least partly comprise semiconducting material which is electrically biasable to provide negative luminescence. In a preferred embodiment the semiconducting material is cadmium mercury telluride or an indium antimonide based material. This may alternatively be any other ternary Group II-VI compound (e.g. mercury zinc telluride, mercury manganese telluride, mercury magnesium telluride, etc.) exhibiting negative luminescence.

In a further aspect the present invention provides a method of shielding an infrared detector from extraneous radiation, the method comprising the steps of:

(a) providing the detector with an optical stop incorporating an entrance pupil, the optical stop at least partly comprising negative luminescence material;

(b) electrically controlling the negative luminescence material to provide for its infrared emission to be at a lower than ambient level; and (c) focusing radiation from a scene via the entrance pupil of the negative luminescence optical stop onto the detector.

This method provides the advantage of improved quality thermal imaging without significant cost to other operative features of the imager.

In order that the invention might be more fully understood, an example thereof will now be described, with reference to the accompanying drawings, in which.

Figure 1:
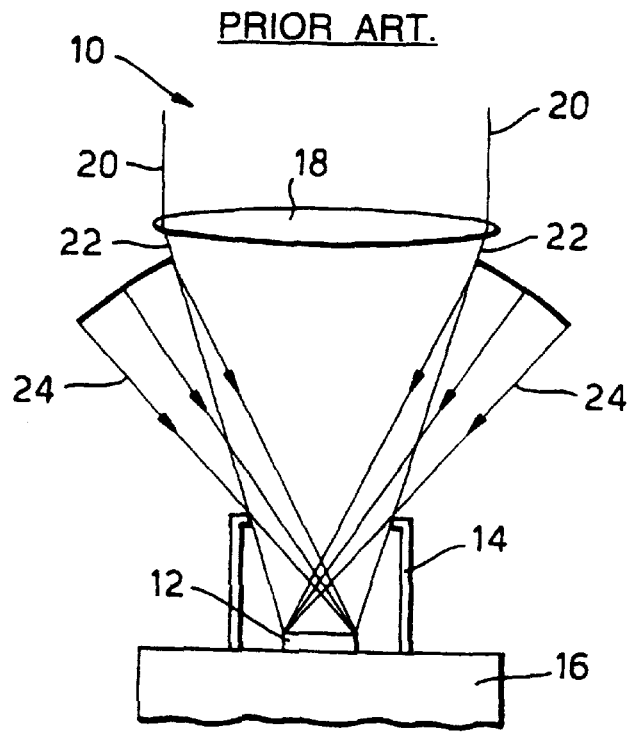
FIG. 1 is a schematic drawing of a prior art infrared optical system.

Referring to FIG. 1, a prior art cold shielded infrared optical system of the imaging kind is shown and is indicated generally by 10. The system 10 incorporates an infrared detector 12 located within a cold shield 14 and mounted on a cooled support 16. The detector 12 may be an array of detector elements or a single such element. It lies in the focal plane of an objective lens 18, which produces an image of a remote scene (not shown) upon it as indicated by rays of light 20 and 22.

The cold shield 14 is intended to restrict radiation incident on the detector 12 to that focused upon it by the lens 18 and emanating from the remote scene. However, despite the cold shield 14, it is possible for stray light rays which are not received directly from the remote scene to reach the detector 12. This is indicated by light rays 24, which originate from directions outside the cone of rays bounded by rays 22 and incident on the detector 12 from the lens 18. In consequence, the detector noise due to incident photons is higher than would be the case were incident light to be limited to the cone of rays bounded by rays 22.

It would be possible to improve matters by increasing the size of the cold shield 14 reducing the separation between its upper surface and the lens 18. This is however unattractive because it increases thermal mass, cool down time and cooling capacity requirements.

Figure 2:
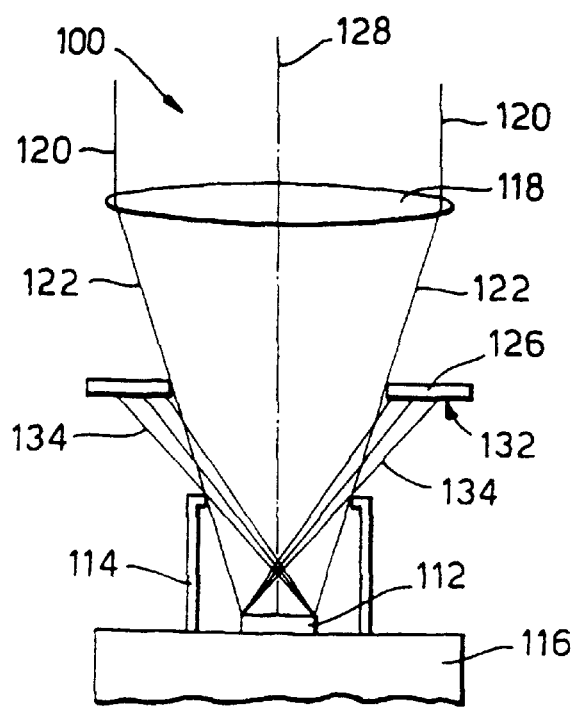
FIG. 2 is a schematic drawing of an infrared optical system of the invention.

Referring now to FIG. 2, there is shown a cold shielded infrared optical system of the invention indicated generally by 100. Parts equivalent to those previously described are like referenced with a prefix 100.

The system 100 incorporates an infrared detector 112 within a cold shield 114, the detector and shield both being mounted on and in thermal equilibrium with a cooled support 116. An objective lens 118 focuses parallel light rays 120 from a remote scene onto the detector 112 as indicated by convergent rays 122, the detector lying in the focal plane of the lens.

A light emitting diode (LED) 126 incorporating an entrance pupil is located at an intermediate position between the cold shield 114 and the lens 118, and is coaxial with the lens optical axis 128. The LED 126 is of the kind which provides negative luminescence in response to bias signals of the appropriate polarity. The shape of the LED 126 and entrance pupil is dependent on the shape of the detector 112 used in the system 100. In the case of a two-dimensional substantially square array of detector elements or for a single detector element the LED 126 should be annular. If however, the detector array is substantially one-dimensional then the LED 126 and entrance pupil function optimally if they are oval and elongated along the detector axis.

The phenomenon of negative luminescence as exhibited by the LED 126 is known. It relates to emission of less radiation than a background level, and is described by Bolgo v̌ et al, in Semiconductors 27(1), January 1993. It is also described by Berdahl et al, Infrared Physics Vol 29, No 2–4, pp 667–672, 1989. Suitable materials for negative luminescence device manufacture include cadmium mercury telluride, indium antimonide and other materials from ternary Group II–VI semiconductor systems.

The LED 126 has an active lower surface 132 which is responsible for negative luminescence. The surface 132 therefore emits fewer photons than a surface in thermal equilibrium with its surroundings. Photons indicated by light rays such as 134 passing from the detector 112 are absorbed by the surface 132, which returns a lower intensity photon flux than a conventional optical shield at the same temperature as this surface. The surface 132 consequently acts as an optical stop which prevents stray light reaching the detector 112 whilst itself radiating to a lesser extent than a normal optical stop. Stray radiation equivalent to rays 24 in FIG. 1 is therefore largely excluded from reaching the detector 112, and the latter does not receive as much radiation as that which would reach it from an uncooled surface which did not exhibit negative luminescence but which was otherwise of equivalent structure and properties. Since the LED 126 is not required to cool down, it can be switched on quickly avoiding the need for a long cool down time associated with a large cold shield.

Moreover, if the LED 126 provides a sufficiently high magnitude of negative luminescence, it will provide additional cooling for the detector 112. The criterion for this is that the radiation emitted by the detector 112 which is incident on the LED 126 is greater than the radiation emitted by the LED 126 which is absorbed by the detector 112. The benefit is that the cooling capacity required for the support 116 is reduced as compared to what would otherwise be appropriate.

The optical system 100 is shown with a single objective lens 118 imaging a remote scene onto the detector 112. It is known to have more complex imaging systems employing multiple lenses and/or mirrors to image a scene. In these systems, exclusion of stray radiation is best performed if the LED 126 is located between the detector and the final focusing element (lens or mirror) nearest to it. Further lenses or mirrors between the LED and detector would give more scope for stray light to reach the detector. However design constraints may favour use of a smaller LED 126. The size of the LED device can be minimised if it is placed at an intermediate focal plane within the multiple arrangement of lenses and/or mirrors. Thus the loss in exclusion performance of the LED has to be balanced with the advantages to be had in the fabrication of a smaller device.

A further embodiment of the invention is provided by incorporation of the negative luminescence LED 126 into a scanning thermal imager. Generally, such imagers additionally include a mechanical scanning mechanism arranged to scan a large scene area over a detector. Again a balance has to be sought between maximising the excluding capability of the LED 126 by locating it between the detector and the final (closest) element of the combined focusing/scanning system and the advantages gained in using a smaller device located about an intermediate focal point.

What is claimed is:

1. An infrared optical system including detecting means (112) and an optical stop (126) arranged to exclude stray radiation from reaching the detecting means (112), characterised in that the optical stop (126) is arranged to exhibit negative luminescence to reduce radiation incident on the detecting means (112).

2. A system according to claim 1 characterised in that the optical stop incorporates a hole which is disposed coaxially with an optical axis (128) of the system (100).

3. A system according to claim 1 having a single objective lens (118) for directing infrared radiation to the detecting means and a cold shield (114) for the detecting means, characterised in that the optical stop (126) is located between the lens (118) and cold shield (114).

4. A system according to claim 1 having a plurality of focusing elements arranged in combination to image a scene onto the detecting means, characterised in that the optical stop (126) is positioned interjacent the focusing elements and detecting means of the system.

5. A system according to claim 4 characterised in that the optical stop (126) is disposed between the detecting means (112) and that focusing element which is nearest to the detecting means.

6. A system according to claim 4 characterised in that the optical stop (126) is positioned at an intermediate focal plane within the plurality of focusing elements.

7. A system according to claim 4 characterised in that it includes means for scanning a scene over the detecting means.

8. A system according to claim 1 arranged to scan a scene over the detecting means, characterised in that the optical stop (126) is disposed between the detecting means and an optical element nearest to the detecting means.

9. An imaging system according to claim 1 characterised in that the optical stop (126) at least partly comprises semiconducting material which is electrically biasable to provide negative luminescence.

10. An imaging system according to claim 9 characterised in that the semiconducting material is cadmium mercury telluride, an indium antimonide based material or any other ternary Group II-VI compound exhibiting negative luminescence.

11. A method of shielding an infrared detector (112) from extraneous radiation (134), the method comprising the steps of:

(a) providing the detector with an optical stop (126) incorporating an entrance pupil, the optical stop (126) at least partly comprising negative luminescence material;

(b) electrically controlling the negative luminescence material to provide for its infrared emission to be at a lower than ambient level; and (c) focusing radiation from a scene via the entrance pupil of the negative luminescence optical stop (126) onto the detector (112).

* * * * *